(12) United States Patent
Araya

(10) Patent No.: US 8,042,074 B2
(45) Date of Patent: Oct. 18, 2011

(54) CIRCUIT DESIGN DEVICE, CIRCUIT DESIGN PROGRAM, AND CIRCUIT DESIGN METHOD

(75) Inventor: Yasuteru Araya, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 547 days.

(21) Appl. No.: 12/222,368

(22) Filed: Aug. 7, 2008

(65) Prior Publication Data
US 2009/0055781 A1 Feb. 26, 2009

(30) Foreign Application Priority Data

Aug. 24, 2007 (JP) ................. 2007-218308

(51) Int. Cl.
*G06F 17/50* (2006.01)
*G06F 9/45* (2006.01)
(52) U.S. Cl. .................... 716/103; 716/104
(58) Field of Classification Search .......... 716/101, 716/103–104, 114, 134
See application file for complete search history.

(56) References Cited

U.S. PATENT DOCUMENTS

| 2004/0194038 A1* | 9/2004 | Tamai ............... 716/1 |
| 2006/0236278 A1* | 10/2006 | Shimony ........... 716/6 |
| 2006/0253822 A1* | 11/2006 | Matsumura et al. ....... 716/6 |
| 2006/0253823 A1* | 11/2006 | Matsumura et al. ....... 716/6 |
| 2007/0214447 A1* | 9/2007 | Okada ............. 716/18 |
| 2008/0072188 A1* | 3/2008 | Ja et al. ............ 716/4 |

FOREIGN PATENT DOCUMENTS

| JP | 57-108911 | 7/1982 |
| JP | 2002-092065 A | 3/2002 |
| JP | 2002-351571 A | 12/2002 |
| JP | 2003-330988 A | 11/2003 |

* cited by examiner

*Primary Examiner* — Stacy Whitmore
(74) *Attorney, Agent, or Firm* — Foley & Lardner LLP

(57) ABSTRACT

A circuit design device according to an embodiment of the present invention includes a processor performing operations of: extracting flip-flops each receiving a first clock and a control signal, from flip-flops represented in a first hardware description representing a circuit; generating a second hardware description by replacing the first clock received by each of the extracted flip-flops with a second clock; and generating a third hardware description by inserting, into the second hardware description, data of a control circuit to stop supply of the second clock based on the first clock and the control signal.

8 Claims, 17 Drawing Sheets

| F/F NAME | CLOCK NAME | RESET NAME | RESET ACTIVE INFORMATION |
|---|---|---|---|
| F/F1 | CLK1 | RSTB | LOW |
| F/F2 | CLK1 | RSTB | LOW |
| F/F3 | CLK1 | RSTB1 | LOW |
| F/F4 | CLK1 | RSTB1 | LOW |
| F/F5 | CLK2 | RSTB | LOW |
| F/F6 | CLK2 | RSTB2 | LOW |
| F/F7 | CLK2 | RSTB2 | LOW |
| F/F8 | CLK2 | RSTB2 | LOW |

Fig. 7

| GROUP | CLOCK NAME | RESET NAME | RESET ACTIVE INFORMATION | F/F |
|---|---|---|---|---|
| 1 | CLK1 | RSTB | LOW | F/F1, F/F2 |
| 2 | CLK1 | RSTB1 | LOW | F/F3, F/F4 |
| 3 | CLK2 | RSTB | LOW | F/F5 |
| 4 | CLK2 | RSTB2 | LOW | F/F6, F/F7, F/F8 |

Fig. 8

| VALUE | UNIT | REFERENCE CLOCK |
|---|---|---|
| 3 | CLOCK | CLK1 |
| 3 | CLOCK | CLK2 |

Fig. 11

| VALUE | UNIT |
|---|---|
| 5 | MSEC |

Fig. 12

| VALUE | UNIT | DELAY ELEMENT |
|---|---|---|
| 2 | NUMBER | TDXDLY1 |

Fig. 13

CIRCUIT DESIGN DEVICE, CIRCUIT DESIGN PROGRAM, AND CIRCUIT DESIGN METHOD

BACKGROUND OF THE INVENTION

1. Field of the Invention

The present invention relates to a design of a system LSI (Large Scale Integration), and more particularly, to a circuit design device, a circuit design program, and a circuit design method for stopping clock supply.

2. Description of Related Art

Up to now, clock supply to an entire LSI is carried out in a unified way, and a circuit for stopping clock supply (hereinafter, referred to as "clock supply stopping circuit") is manually inserted into the LSI. In recent years, with an increase in scale of the LSI, the conventional LSI is treated as a macro block serving as a single component. For this reason, it is necessary for the clock supply stopping circuit, which is inserted into the LSI, to control a large number of macro blocks. Thus, the clock supply stopping circuit has become more diversified and complicated.

Meanwhile, there is known a technique for inserting the clock supply stopping circuit into a flip-flop (hereinafter, referred to as "F/F") which does not operate in an LSI. A period in which each F/F does not operate is manually extracted, and based on a result of the extraction, the clock supply stopping circuit is inserted. The insertion of the clock supply stopping circuit is time consuming. Further, in the above-mentioned method of inserting the clock supply stopping circuit, the probability of an error occurring in the extraction and insertion of the clock supply stopping circuit is high. As a result, there arises a problem in that a development period is prolonged and costs thereof are increased.

To solve the above-mentioned problem, it is necessary to provide a method of automatically inserting the clock supply stopping circuit, and a new circuit configuration therefor. For example, relevant techniques as described below are disclosed.

For example, Japanese Unexamined Patent Application Publication No. 2003-330988 discloses a logic circuit design method including the steps of: detecting, from a hardware description, a register forming a state machine and a register operating only when the state machine is in a state other than an idle state; and generating a gated clock supply circuit for supplying a gated clock to the detected registers, to reflect the gated clock supply circuit in the hardware description, and a device therefor. This is a method of inserting the clock supply stopping circuit for stopping clock supply when the state machine is in the idle state.

FIG. 17 is a schematic diagram showing an embodiment of the logic circuit design device as disclosed in Japanese Unexamined Patent Application Publication No. 2003-330988. The logic circuit design device shown in FIG. 17 includes: a unit $10p$ for inputting conditions for detecting registers; a unit $20p$ for detecting a register forming a state machine, from a hardware description (HDL source); a unit $30p$ for detecting the idle state of the state machine, from the HDL source; a unit $40p$ for detecting a register operating only when the state machine is in a state other than the idle state, from the HDL source; a unit $50p$ for generating a gated clock supply circuit for supplying a gated clock to the detected registers; and a unit $60p$ for generating a hardware description reflecting the generated gated clock supply circuit.

FIG. 18 is a circuit diagram showing the gated clock supply circuit generated by the logic circuit design device shown in FIG. 17. As shown in FIG. 18, a circuit block 1 (idle state determination) $70p$ detects the idle state of the state machine to generate an enable signal IDL_EN for the clock supply stopping circuit. A circuit block 2 (FF) $80p$ and a circuit block 3 (AND) $90p$ enable automatic insertion of the clock supply stopping circuit only into a circuit block 4 (CURRENT_STATE register C) $100p$ forming the state machine.

Japanese Unexamined Patent Application Publication No. 2002-92065 discloses a circuit design method and a circuit design device for changing a first F/F (flip-flop), in which a content of an enable signal in an enable state is updated in synchronization with a clock signal, into a second F/F in which the clock signal is gated based on the enable signal. This is a method of inserting the clock supply stopping circuit when the F/F is in a disable state.

FIG. 19 is a diagram showing the configuration of the circuit design device as disclosed in Japanese Unexamined Patent Application Publication No. 2002-92065. The circuit design device shown in FIG. 19 implements a circuit design method as described below. The circuit design method includes: a step ($2p$) of obtaining an operation condition of an F/F by analyzing a hardware description, to extract an enable signal; a step ($3p$) of changing the hardware description into a hardware description indicating a correspondence relation between the enable signal and the F/F; a step ($5p$) of inputting the changed RTL description and test vectors to simulate a circuit; a step of obtaining an active ratio that is a ratio at which the enable state is obtained from the simulation result; a step ($7p$) of changing the F/F into a gated clocked F/F based on the active ratio; and a step ($8p$) of outputting the result as a hardware description.

FIG. 20 is a diagram showing the configuration obtained by forming a gated clock using the logic circuit design device shown in FIG. 19. Referring to FIG. 20, a description is given of a logic circuit represented in the hardware description obtained after inserting the clock supply stopping circuit generated using the technique disclosed in Japanese Unexamined Patent Application Publication No. 2002-92065. In FIG. 20, "en" representing a signal corresponding to an input of a latch circuit $103p$ becomes High when an F/F $102p$ is operating and becomes Low when the F/F $102p$ is not operating. The latch circuit $103p$ and an AND gate $104p$ enable automatic insertion of the clock supply stopping circuit only into the F/F $102p$ with an enable. Further, as a related art, there is disclosed the following clock signal control system (see Japanese Unexamined Patent Application Publication No. 57-108911). That is, in an electronic computer incorporating a group of flip-flop circuits having an extremely high propagation rate, to prevent an output from the flip-flop circuits from being unstable when a clock signal and a reset signal are simultaneously input to the flip-flop circuits, a reset operation is performed in a state where the input of the clock signal is temporarily stopped, to thereby bring the group of flip-flop circuits into a complete reset state.

However, the technique as disclosed in Japanese Unexamined Patent Application Publication No. 2003-330988 relates to the method of inserting the clock supply stopping circuit only into the F/F forming the state machine. Further, the technique as disclosed in Japanese Unexamined Patent Application Publication No. 2002-92065 relates to the method of inserting the clock supply stopping circuit only into the F/F with an enable. Accordingly, in the techniques as disclosed in Japanese Unexamined Patent Application Publication Nos. 2003-330988 and 2002-92065, it is impossible to insert the clock supply stopping circuit into F/Fs other than the F/F forming the state machine and the F/F with an enable.

An F/F is also used as, for example, a circuit for holding a set value or a circuit for delaying data by several clocks.

Accordingly, the F/F is not limited to an F/F used as a circuit forming a state machine and an F/F with an enable. In various types of circuits, F/Fs that do not operate in a reset state are used in many cases. Thus, in the techniques as disclosed in Japanese Unexamined Patent Application Publication Nos. 2003-330988 and 2002-92065, there are a large number of F/Fs that are not extracted as the F/Fs into which the clock supply stopping circuit is inserted. The F/Fs that cannot be extracted according to the techniques as disclosed in Japanese Unexamined Patent Application Publication Nos. 2003-330988 and 2002-92065 correspond to the F/Fs that do not operate in the reset state.

As described above, in the conventional techniques, it is impossible to automatically insert the clock supply stopping circuit into F/Fs receiving a prescribed control signal.

SUMMARY

In one embodiment of the present invention, there is provided a circuit design device including a processor performing operations of: extracting flip-flops each receiving a first clock and a control signal, from flip-flops represented in a first hardware description representing a circuit; generating a second hardware description by replacing the first clock received by each of the extracted flip-flops with a second clock; and generating a third hardware description by inserting, into the second hardware description, data of a control circuit to stop supply of the second clock based on the first clock and the control signal.

According to the present invention, flip-flops receiving the same clock and the same control signal are extracted, thereby making it possible to automatically insert a control circuit to control clock supply to the extracted flip-flops. Consequently, the power consumption of a logic circuit can be reduced and the efficiency of an operation for designing the logic circuit can be improved.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 7 is a table showing an example of an F/F information table;

FIG. 8 is a table showing an example of a group table generated with reference to FIG. 7;

FIG. 11 is a table showing an example of a parameter (delay information);

FIG. 12 is a table showing another example of a parameter (delay information);

FIG. 13 is a table showing still another example of a parameter (delay information);

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments of the present invention will be described with reference to the drawings. For clarification of explanation, the following description and drawings are appropriately omitted and simplified. In each drawing, components having the same configuration or function, and corresponding parts are denoted by the same reference symbols, and a description thereof is omitted.

First Embodiment

In a first embodiment of the present invention, a description is given of one mode of a circuit design to classify F/Fs represented in a hardware description into groups and to insert a circuit for stopping clock supply (hereinafter, referred to as "clock supply stopping circuit") into each of the groups.

Figure 1:
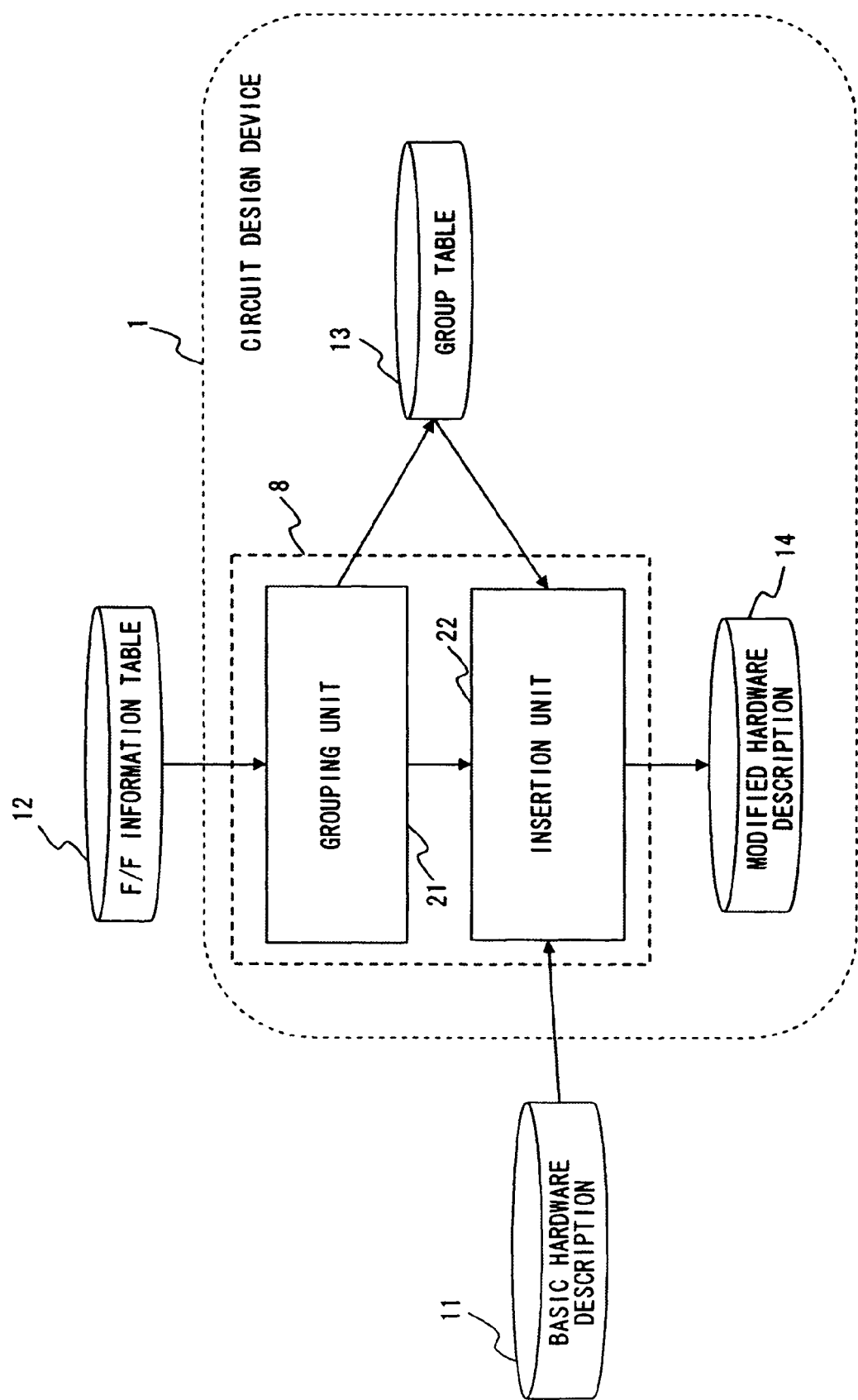
FIG. 1 is a diagram showing the concept of a circuit design device according to a first embodiment of the present invention.

FIG. 1 is a diagram showing the concept of a circuit design device according to the first embodiment. A circuit design device 1 obtains a basic hardware description 11 and information contained in an F/F information table 12. The circuit design device 1 includes a grouping unit 21 and a unit for automatically inserting the clock supply stopping circuit (hereinafter, referred to as "insertion unit") 22 that are provided as components for executing processing. Further, the circuit design device 1 generates a group table 13 and a hardware description obtained after the insertion of the clock supply stopping circuit (hereinafter, referred to as "modified hardware description") 14, and outputs the modified hardware description 14 thus generated.

The basic hardware description 11 is a hardware description representing a logic circuit which does not include any clock supply stopping circuits.

The F/F information table 12 is an information table including names of F/Fs represented in the basic hardware description 11, reset names thereof, and logics (reset active information) for resetting the F/Fs. For example, FIG. 7 shows the F/F information table 12 including information of the F/Fs represented in the basic hardware description which represents a circuit shown in FIG. 5. The reset active information is represented by "Hi" or "Low". Clock names, reset names, and reset active information herein described are collectively referred to as "reset information". The F/F information table 12 can be obtained by a generally-known method based on the basic hardware description 11. For example, the F/F information table 12 can be obtained by analyzing the basic hardware description 11 using Conformal-ASIC as an EDA tool. The F/F information table 12 is referred to also as "Clock/Reset/Reset Active table".

The group table 13 is a group information table obtained by classifying F/Fs held in the F/F information table 12 into groups of F/Fs having the same clock name, reset name, and reset active information. FIG. 8 shows an example of the group table 13 used for explaining the first embodiment. In FIG. 8, the F/Fs shown in FIG. 7 are classified into four groups each having the same clock name, reset name, and reset active information. The group table 13 is used for inserting a minimum size clock supply stopping circuit when the insertion unit 22 automatically inserts the clock supply stopping circuit.

The modified hardware description 14 is a hardware description obtained by automatically inserting data of the clock supply stopping circuit into the basic hardware description 11.

The grouping unit 21 obtains names and reset names of the F/Fs, and logics for resetting the F/Fs, that is, reset information, from the F/F information table 12, and classifies the F/Fs represented in the basic hardware description 11 into groups of F/Fs having the same clock name, reset name, and reset active information. The grouping unit 21 outputs, as the group table 13, group information obtained by classifying the F/Fs into groups each having the same reset information. The grouping unit 21 stores, in the group table 13, the group information associating the names of the F/Fs having the same reset information with the reset information (specifically, clock name, reset name, and reset active information) common to the F/Fs.

The insertion unit 22 obtains the basic hardware description 11 and the information that is produced by the grouping unit 21 and stored in the group table 13, and automatically inserts data of the clock supply stopping circuit into the basic hardware description 11 according to the groups stored in the group table 13. Herein, the clock supply stopping circuit is a circuit which operates so as to stop clock supply in an enable state and which prevents a whisker from being caused in an enable or disable state.

Although not illustrated in FIG. 1, the circuit design device 1 has a storage area for storing the basic hardware description 11 and the F/F information table 12. Furthermore, the circuit design device 1 has a storage area for storing the created group table 13 and the modified hardware description 14. For example, the basic hardware description 11 may be stored in a first storage area, the F/F information table 12 may be stored in a second storage area, the group table 13 may be stored in a third storage area, and the modified hardware description 14 may be stored in a fourth storage area. The grouping unit 21 and the insertion unit 22 are collectively referred to as a control unit 8. The control unit 8 may be configured by a combination of at least two of hardware, firmware, and software, or may be configured by any one of hardware, firmware, and software. In a portion realized by software, a program is loaded into a memory and commands are executed by a CPU. According, the control unit 8 can be also realized by a combination of a circuit and software (execution of commands by CPU). A description is given below of a case where the grouping unit 21 and the insertion unit 22 are realized by a program.

Figure 2:
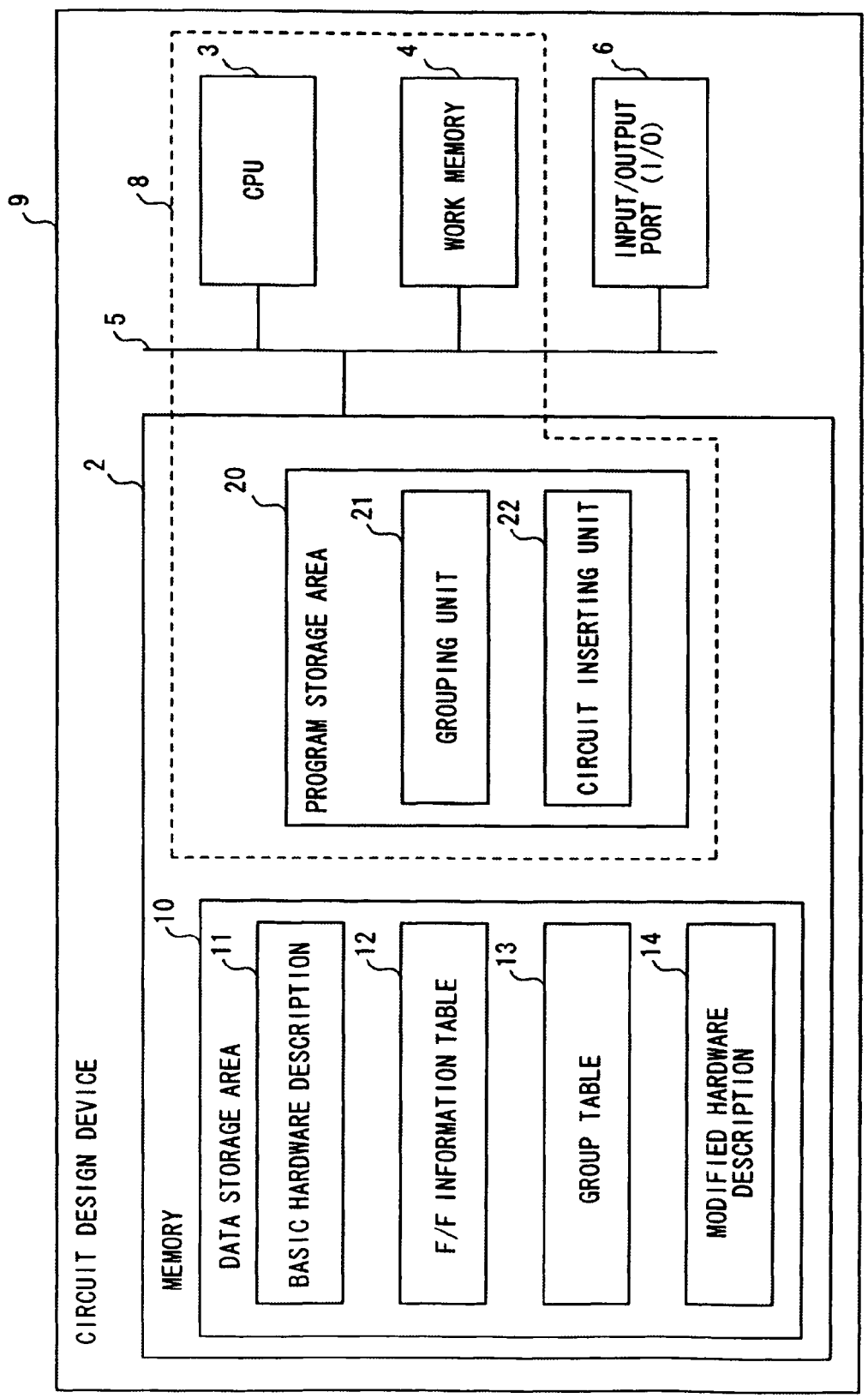
FIG. 2 is a diagram showing a configuration example in a case where the circuit design device according to the first embodiment is implemented on a computer.

FIG. 2 shows an example of the configuration of the circuit design device 1 according to the first embodiment. A circuit design device 9 shown in FIG. 2 includes a memory 2, a CPU (Central Processing Unit) 3, a work memory 4, a bus 5, and an input/output (I/O) 6.

The memory 2 has a data storage area 10 and a program storage area 20. The data storage area 10 includes an area for storing at least the basic hardware description 11 and the F/F information table 12, which are input through the input/output port 6, and the group table 13 and the modified hardware description 14 which are generated by the circuit design device 9. The program storage area 20 includes an area for storing at least the grouping unit 21 and the insertion unit 22. FIG. 2 shows an example of each of the storage areas included in the data storage area 10 and the program storage area 20, and storage areas other than those storage areas may be included.

The CPU 3 controls processing executed by the circuit design device 9. The work memory 4 is an area for temporarily storing a program or data to be executed by the CPU. For example, a volatile memory such as a RAM (Random Access Memory) is employed. The components provided in the circuit design device 9 exchange data with each other via the bus 5.

The input/output port 6, for example, receives the basic hardware description 11 and the F/F information table 12, and outputs the basic hardware description 11 and the F/F information table 12 to the data storage area 10 via the bus 5. Further, the input/output port 6, for example, externally outputs the modified hardware description 14 generated by the insertion unit 22. A detailed description of the input/output port 6 is herein omitted. Note that the configuration of FIG. 2 is illustrated as an example, and the circuit design device 1 is not limited to the configuration of FIG. 2. Any configuration may be employed as long as the circuit design device implements functions described below. Furthermore, the basic hardware description 11 and the modified hardware description 14 herein described are distinguished from each other. Alternatively, the basic hardware description 11 may be overwritten by inserting data of the clock supply stopping circuit into the basic hardware description 11. Thus, the storage areas of two hardware descriptions may be commonly used.

Referring next to FIGS. 2, 3, 5, 7, and 8, a description is given of an example of the operation for automatically inserting data of the clock supply stopping circuit by the circuit design device according to the first embodiment. Note that the example of the specific operation according to the first embodiment is described below by using the basic hardware description 11 that represents the circuit shown in FIG. 5. The circuit design device according to the first embodiment can also be applied to a basic hardware description that represents a circuit other than the circuit shown in FIG. 5.

Figure 3:
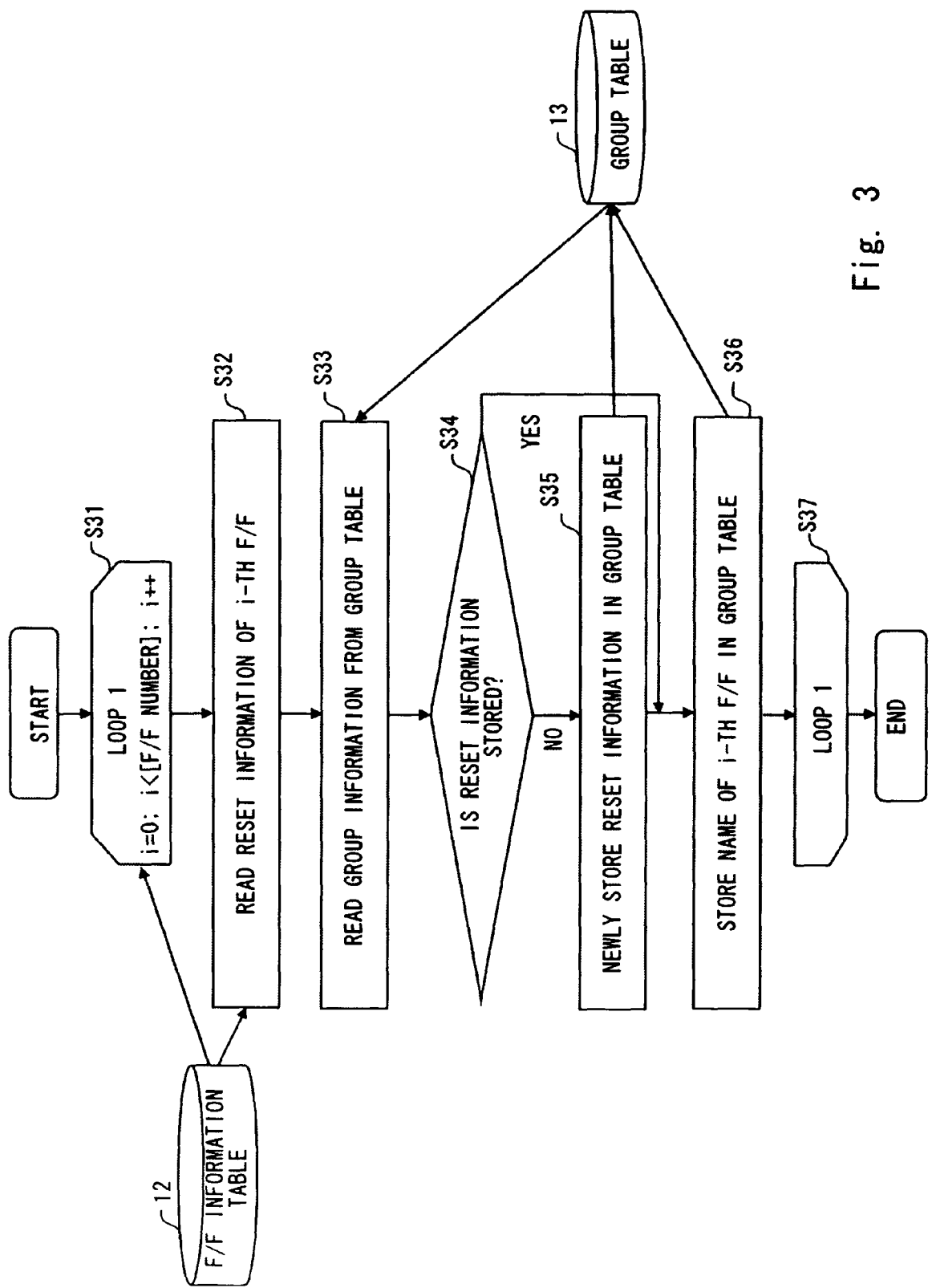
FIG. 3 is a flowchart showing an operation example of a grouping unit according to the first embodiment.

First, the CPU 3 accesses the program storage area 20 of the memory 2 via the bus 5 to read the grouping unit 21 from the program storage area 20 of the memory 2 to the work memory 4, and executes the read grouping unit 21. Based on the executed grouping unit 21, the CPU 3 accesses the data storage area 10 of the memory 2 via the bus 5. Then, the CPU 3 obtains the number of F/Fs represented in the basic hardware description 11, from the F/F information table 12 stored in the data storage area 10 (S31). In this case, the F/F information table 12 includes reset information of the F/Fs represented in the basic hardware description 11 that represents the circuit shown in FIG. 5. That is, the F/F information table 12 includes reset information shown in FIG. 7. Accordingly, when the data storage area 10 stores the F/F information table 12 shown in FIG. 7, for example, the CPU 3 obtains a value of "8" as the number of F/Fs, from the F/F information table 12. After that, the CPU 3 repeats processing from Step S32 to Step S36 the number of times corresponding to the obtained number of F/Fs with respect to each of the F/Fs to be processed (hereinafter, F/F to be processed is referred to as "processing target F/F"). In FIG. 3, the processing target F/F is an i-th read F/F among the F/Fs read from the F/F information table.

The CPU 3 reads the reset information (clock name, reset name, and reset active information) of the processing target F/F from the F/F information table 12 (S32). Referring to FIG. 7, for example, in the case of reading information of a first processing target F/F from the F/F information table 12 stored in the data storage area 10 of the memory 2, the CPU 3 reads three kinds of information, that is, CLK1 as a clock name, RSTB as a reset name, and Low as reset active information. Then, the CPU 3 accesses the group table 13 stored in the data storage area 10 of the memory 2 via the bus 5. After that, the CPU 3 reads the group information from the group table 13 (S33). When a plurality of pieces of group information are stored, the CPU 3 reads the group information of the entire group from the group table 13.

The CPU 3 compares the reset information of one processing target F/F (for example, first F/F) read from the F/F information table 12 with the group information from the group table 13 (S34). Specifically, the CPU 3 compares the clock name, reset name, and reset active information of the one processing target F/F, with the clock names, reset names, and reset active information which are stored in the group table 13. Then, when the reset information of the one processing target F/F is already stored in the group table 13 (YES in S34), the CPU 3 accesses the data storage area 10 of the memory 2 via the bus 5, and stores the name of the one processing target F/F (F/F name) in the group information contained in the group table 13 that corresponds to the reset information of the one processing target F/F (S36). When the reset information of the one processing target F/F is not stored in the group information contained in the group table 13 (NO in S34), the CPU 3 accesses the data storage area 10 of the memory 2 in a similar manner, and newly stores the clock name, reset name, and reset active information that are contained in the reset information of the one processing target F/F, in the group table 13 (S35). After that, the CPU 3 stores the F/F name of the one processing target F/F in the group information newly stored (S36). When other processing target F/Fs are present, the CPU 3 repeats the processing from S32 (S37).

For example, when the CPU 3 executes the processing from S32 to S36 with respect to the first F/F shown in FIG. 7, the processing from S32 to S36 is executed again with respect to a second F/F shown in FIG. 7. In this example, in S31, the CPU 3 obtains a value of "8" as the number of F/Fs from the F/F information table 12 shown in FIG. 7. Accordingly, the CPU 3 repeats the processing from S32 to S36 eight times in total. Further, in this example, the CPU 3 creates the group table 13 shown in FIG. 8. The CPU 3 may hold the group table 13 as intermediate data.

Then, the CPU 3 accesses the memory 2 via the bus 5 to read the insertion unit 22, which is stored in the program storage area 20 of the memory 2, into the work memory 4, and executes the read insertion unit 22. Based on the executed insertion unit 22, the CPU 3 inserts data of the clock supply stopping circuit into the basic hardware description 11. A description is given of, as an example, the operation for inserting the clock supply stopping circuit into the circuit shown in FIG. 5 by the CPU 3 using the basic hardware description 11 that represents the circuit shown in FIG. 5 as described above. The operation is described below with reference to FIGS. 2 and 4 to 8.

First, the CPU 3 obtains a value of "4" as the number of groups from the group table 13 based on the executed insertion unit 22 (S41). The CPU 3 repeats processing from Step S42 to Step S46 the number of times corresponding to the obtained number of groups. In the following description, it is assumed that i-th group information (Group [i]) to be processed in each of Steps S42 to S46 is determined as the group information to be processed.

Figure 5:
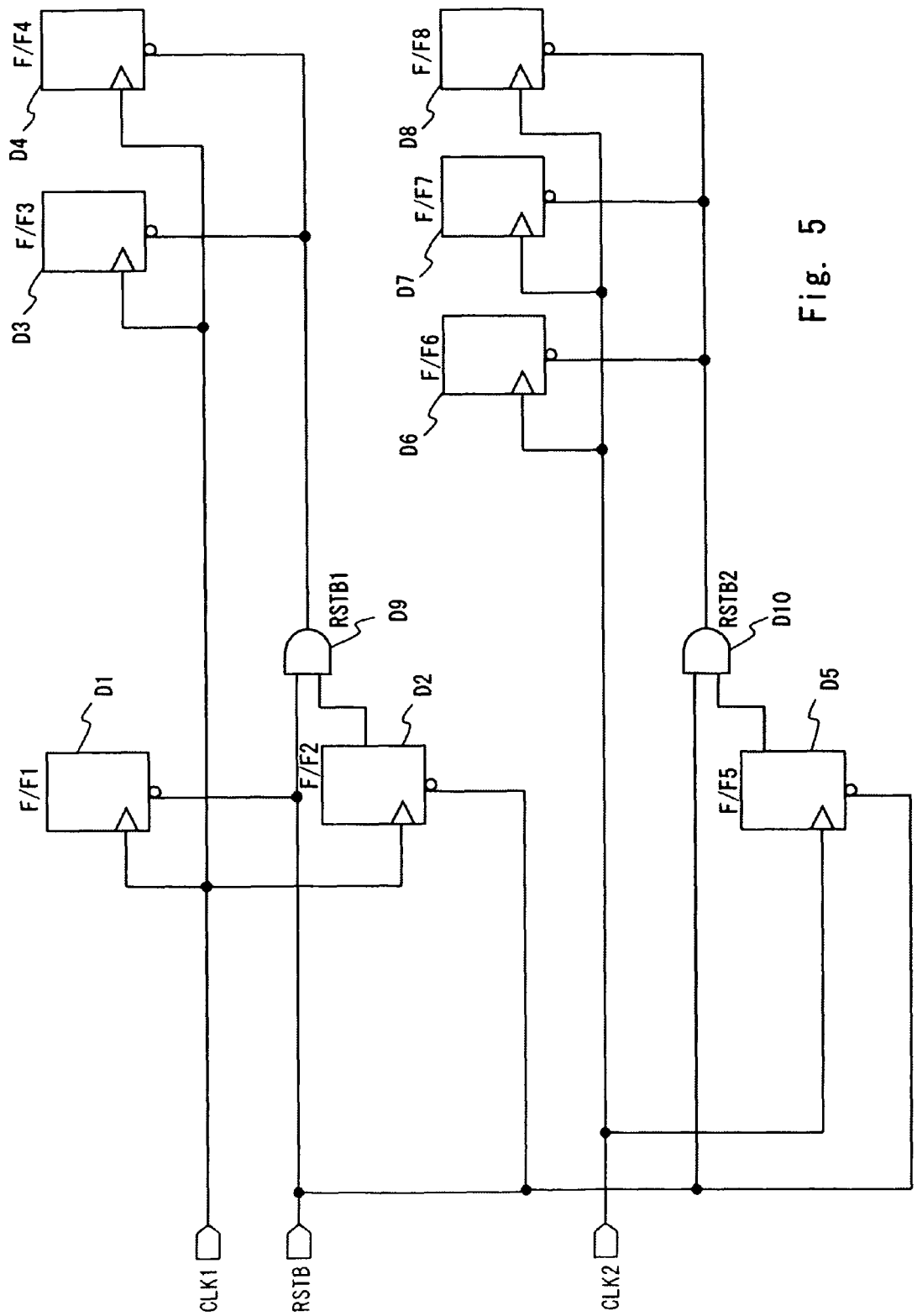
FIG. 5 is a diagram showing an example of a circuit represented in a basic hardware description.

The CPU 3 obtains the number of F/Fs included in one processing target group (S42). For example, when the processing target group corresponds to Group 1 of FIG. 8, the CPU 3 obtains a value of "2". This is because the Group 1 of FIG. 8 includes two F/Fs, that is, an F/F1 and an F/F2 as illustrated in FIG. 5. Then, the CPU 3 accesses the data storage area 10 of the memory 2 via the bus 5 to obtain the basic hardware description 11 (S43). After that, the CPU 3 renames, to another name, the clock received by each of the F/Fs, which are contained in the processing target group represented in the obtained basic hardware description 11 (S43). For example, when the Group 1 of the group table 13 shown in FIG. 8 is the processing target group, the CPU 3 renames the clock received by each of the F/Fs, which are represented in the basic hardware description 11 and are contained in the Group 1, from CLK1 to CLK1_G1. Then, the CPU 3 generates a hardware description 16 which is obtained after the clock renaming and in which the clock received by each of the F/Fs is renamed from CLK1 to CLK1_G1 (S43). The hardware description obtained after the clock renaming corresponds to intermediate data, and the CPU 3 holds the hardware description 16 obtained after the clock renaming, in the work memory 4.

Then, the CPU 3 inserts data of the clock supply stopping circuit into the hardware description 16 obtained after the clock renaming, thereby obtaining a modified hardware description. In this case, the clock supply stopping circuit includes three terminals, that is, a data terminal, an enable terminal, and an output terminal. Among the three terminals, the data terminal is a terminal for receiving a clock, the enable terminal is a terminal for receiving a reset signal, and the output terminal is a terminal for outputting a signal. The CPU 3 sets the name of the signal received at the data terminal of the clock supply stopping circuit, as the name of the clock signal output to each of the F/Fs contained in the processing target group (S45). For example, when the processing target group corresponds to the first group, that is, the Group 1 of the group table 13 shown in FIG. 8, the CPU 3 sets the name of the signal received at the data terminal of one clock supply stopping circuit to be inserted, as CLK1. Further, the CPU 3 sets the name of the reset signal received at the enable terminal of the clock supply stopping circuit, as the name of the reset signal received by each of the F/Fs contained in the processing target group (S45). For example, when the first group of the group table shown in FIG. 8 is the processing target group, the CPU 3 sets the name of the signal received at the enable terminal of the one clock supply stopping circuit to be inserted, as RSTB.

Furthermore, the CPU 3 sets the reset active information (Hi or Low) of each of the F/Fs contained in the one processing target group, as active information of an enable status of the clock supply stopping circuit. For example, when the first group of the group table 13 shown in FIG. 8 is the processing target group, the CPU 3 sets the active information of the enable status of the clock supply stopping circuit to be inserted, as Low. Then, the CPU 3 sets the name of the signal output from the output terminal of the clock supply stopping circuit, as the clock name obtained through the renaming executed by the CPU 3 in Step S43 (S45). After that, the CPU 3 generates a "hardware description obtained after insertion of data of a clock supply stopping circuit" representing that the clock supply stopping circuit is inserted into the F/Fs contained in the processing target group, and outputs the hardware description thus generated as the modified hardware description 14 (S46). The CPU 3 repeats the above-mentioned processing from S42 to S46 the number of times corresponding to the number obtained in Step S41. Specifically, after repeating the processing from S42 to S46 with respect to each of the groups contained in the group table 13, the CPU 3 completes the automatic insertion of the clock supply stopping circuit. Then, the CPU 3 obtains the modified hardware description 14 that is obtained by inserting the clock supply stopping circuit into every F/F contained in the groups of the group table 13. Specifically, the CPU 3 obtains the modified hardware description 14 that represents a circuit shown in FIG. 6.

After that, the CPU 3 stores the modified hardware description 14 obtained after the automatic insertion of the clock supply stopping circuit, in the data storage area 10 of the memory 2 via the bus 5 (S46).

Figure 6:
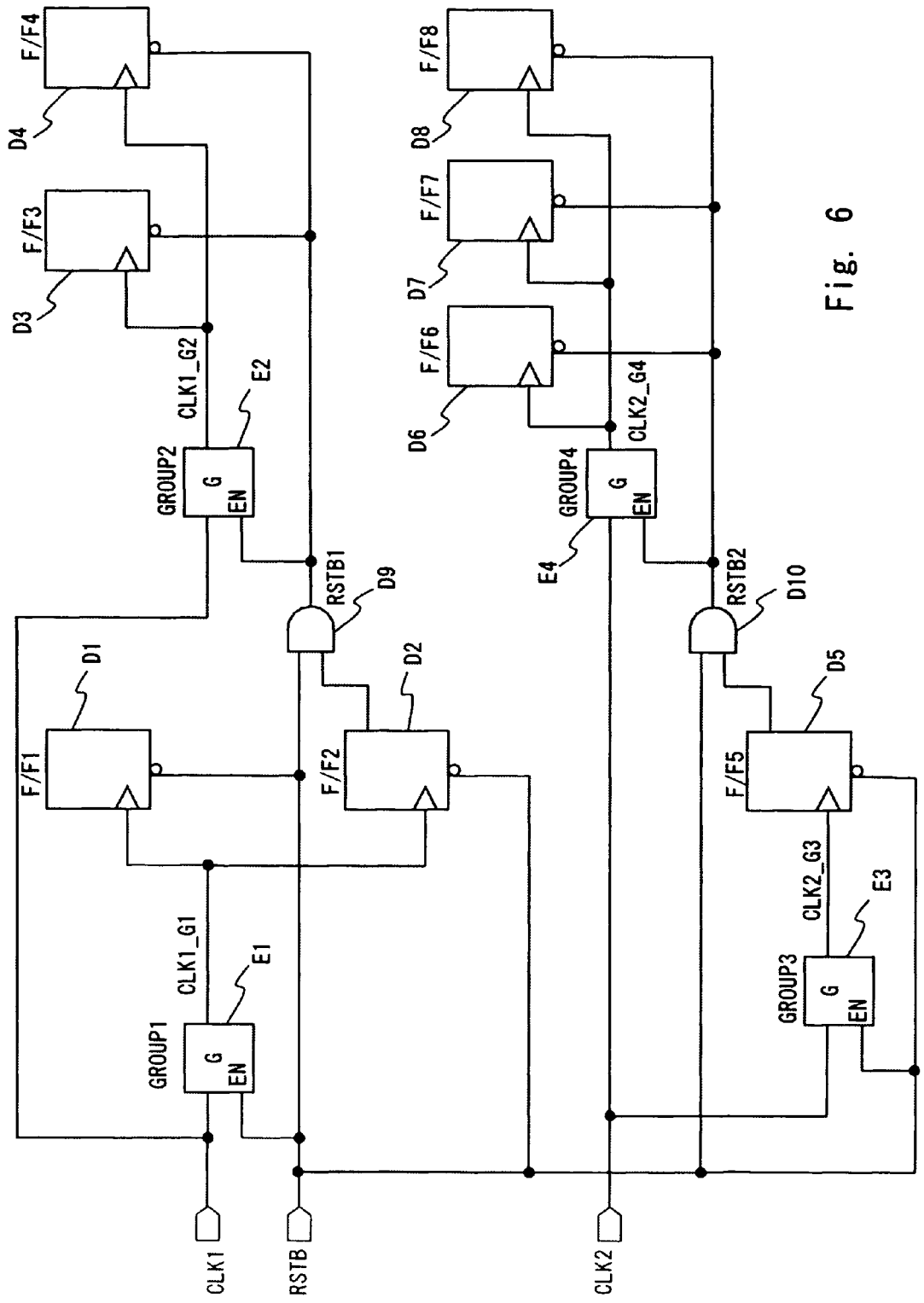
FIG. 6 is a diagram showing an example of a circuit represented in a modified hardware description that is obtained by automatically inserting data of the clock supply stopping circuit into the basic hardware description shown in FIG. 5 according to the first embodiment.

The circuit diagrams of FIGS. 5 and 6 that are used as specific examples in the above description are described by comparing the basic hardware description 11 with the modified hardware description 14. As apparent from the above description of the operation according to the first embodiment, FIG. 5 is a diagram showing an example of the circuit represented in the basic hardware description, and FIG. 6 is a diagram showing an example of the circuit represented in the modified hardware description obtained by automatically inserting data of the clock supply stopping circuit into the basic hardware description shown in FIG. 5.

In the circuit example shown in FIG. 5, a clock name of each of the F/F1 (D1) and the F/F2 (D2) is CLK1, and a reset name thereof is RSTB. A clock name of each of an F/F3 (D3) and an F/F4 (D4) is CLK1, and a reset name thereof is RSTB1 (D9) obtained by performing a logical AND between the RSTB and the F/F2 (D2). A clock name of an F/F5 (D5) is CLK2, and a reset name thereof is RSTB. A clock name of each of an F/F6 (D6), an F/F7 (D7), and an F/F8 (D8) is CLK2, and a reset name thereof is RSTB2 (D10) obtained by performing a logical AND between the RSTB and the F/F5 (D5). Further, reset active information of all the F/Fs (D1 to D8) is Low.

FIG. 7 shows information obtained by a generally-known method (for example, Conformal-ASIC as EDA tool) based on the basic hardware description 11 shown in FIG. 5. FIG. 7 is a table showing an example of the F/F information table. In the description of the operation according to the first embodiment, the table shown in FIG. 7 is particularly used as the F/F information table.

FIG. 8 shows a group table generated by the CPU 3 based on the F/F information table 12 shown in FIG. 7. The CPU 3 creates the group table 13 according to the flow described with reference to FIG. 3, before the execution of the flow shown in FIG. 4 for automatically inserting data of the clock supply stopping circuit. This process is carried out for inserting the minimum size clock supply stopping circuit.

In the F/F information table shown in FIG. 7, the clock name, reset name, and reset active information of the F/F1 are the same as those of the F/F2. Similarly, the clock name, reset name, and reset active information of the F/F3 are the same as those of the F/F4, and the clock name, reset name, and reset active information of the F/F6 are the same as those of the F/F7 and the F/F8. Accordingly, as in the group table 13 shown as an example in FIG. 8, the CPU 3 classifies the F/F1 and the F/F2 as one group, the F/F3 and the F/F4 as one group, and the F/F5, the F/F6, and the F/F8 as one group. Then, the CPU 3 generates group information for each group and stores the group information in the group table. In the example of the F/F information table shown in FIG. 7, the clock name, reset name, and reset active information of the F/F5 do not match those of the other F/Fs. Accordingly, as in the group table 13 shown in FIG. 8, the CPU 3 generates group information for the F/F5 classified as one group and stores the generated group information.

Next, a description is given of the modified hardware description shown in FIG. 6. The CPU 3 generates the modified hardware description 14 shown in FIG. 6 according to the flow described with reference to FIG. 4. Specifically, the CPU 3 performs processing for automatically inserting data of the clock supply stopping circuit into the basic hardware description 11 shown in FIG. 5 based on the group table 13 shown in FIG. 8 to thereby generate the modified hardware description 14.

In the example of the logic circuit represented in the modified hardware description 14 shown in FIG. 6, the clock name of each of the F/F1 (D1) and the F/F2 (D2) is renamed from CLK1 to CLK1_G1. Further, the clock name of each of the F/F3 (D3) and the F/F4 (D4) is renamed from CLK1 to CLK1_G2. The clock name of the F/F5 (D5) is renamed from CLK2 to CLK2_G3. The clock name of each of the F/F6 (D6), the F/F7 (D7), and the F/F8 (D8) is renamed from CLK2 to CLK2_G4. According to the groups stored in the group table 13 shown in FIG. 8, a clock supply stopping circuit (E1) for the Group 1, a clock supply stopping circuit (E2) for the Group 2, a clock supply stopping circuit (E3) for the Group 3, and a clock supply stopping circuit (E4) for the Group 4 are inserted.

The clock supply stopping circuit to be inserted is a generally-known circuit which operates so as to stop clock supply in the enable state and which prevents a whisker from being caused in the enable or disable state. For example, there is employed a clock supply stopping circuit as disclosed in Japanese Unexamined Patent Application Publication No. 2002-351571. Further, in the case of inserting the clock supply stopping circuit, wiring is changed so that a clock output from the clock supply stopping circuit is input to F/Fs.

Figure 9:
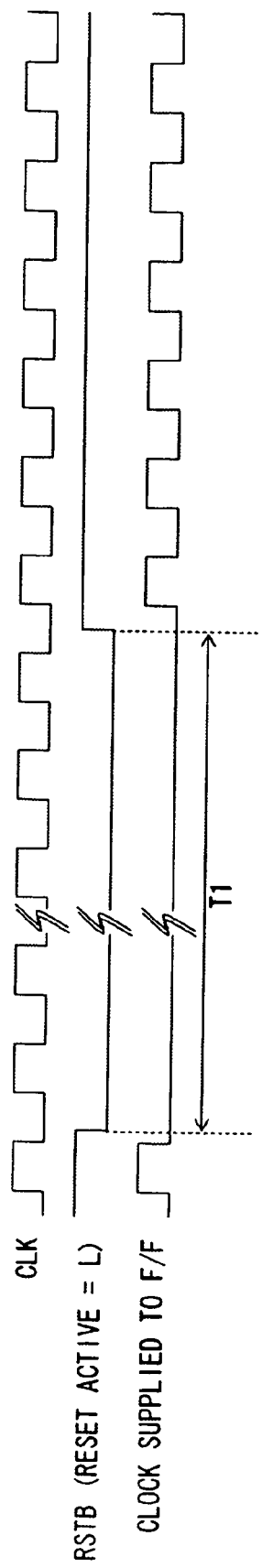
FIG. 9 is a timing chart showing an operation executed in a reset state by a logic circuit formed based on the modified hardware description shown as an example in FIG. 6.

Next, a description is given of a clock supply stopping operation executed in a reset state by the logic circuit formed based on the modified hardware description 14 which includes data of the clock supply stopping circuit and which is obtained by the circuit design device and method according to the first embodiment. FIG. 9 is a timing chart showing an operation executed in the reset state by the logic circuit formed based on the modified hardware description shown as an example in FIG. 6.

A clock CLK shown in FIG. 9 corresponds to each of the CLK1 and CLK2 shown in FIG. 6. A clock shown in FIG. 9 to be supplied to F/Fs corresponds to each of CLK1_G1, CLK1_G2, CLK2_G3, and CLK2_G4 that are shown in FIG. 6. A signal RSTB shown in FIG. 9 corresponds to the RSTB shown in FIG. 6. In FIG. 9, T1 represents a period between a falling edge and a subsequent rising edge of the RSTB. The clock supply stopping circuit automatically inserted according to the present invention stops clock supply to the F/Fs during the period T1.

As described above, the circuit design device and method according to the first embodiment enables the insertion of the clock supply stopping circuit that is common to the F/Fs having the same clock name, reset name, and reset active information among the F/Fs represented in the basic hardware description 11. As a result, the clock supply can be stopped in the reset state, which leads to a reduction in power consumption. Further, by automatically inserting the clock supply stopping circuit, a time required for circuit design can be saved and errors due to a manual operation can be eliminated. Consequently, the operation for designing a logic circuit can be performed with high efficiency.

Second Embodiment

In a second embodiment of the present invention, a description is given of an embodiment in which a function of the clock supply stopping circuit to adjust a period for stopping clock supply is added to the circuit design device and method according to the first embodiment. In the second embodiment, there is employed the configuration in which new processing is added to the processing flow of FIG. 4 to be executed by the CPU 3 according to the first embodiment. Specifically, the insertion unit 22 included in the program storage area 20 of the memory 2 shown in FIG. 2 is replaced by another insertion unit 23. The other configurations, functions, and the like are similar to those of the first embodiment, and a description thereof is omitted.

Figure 10:
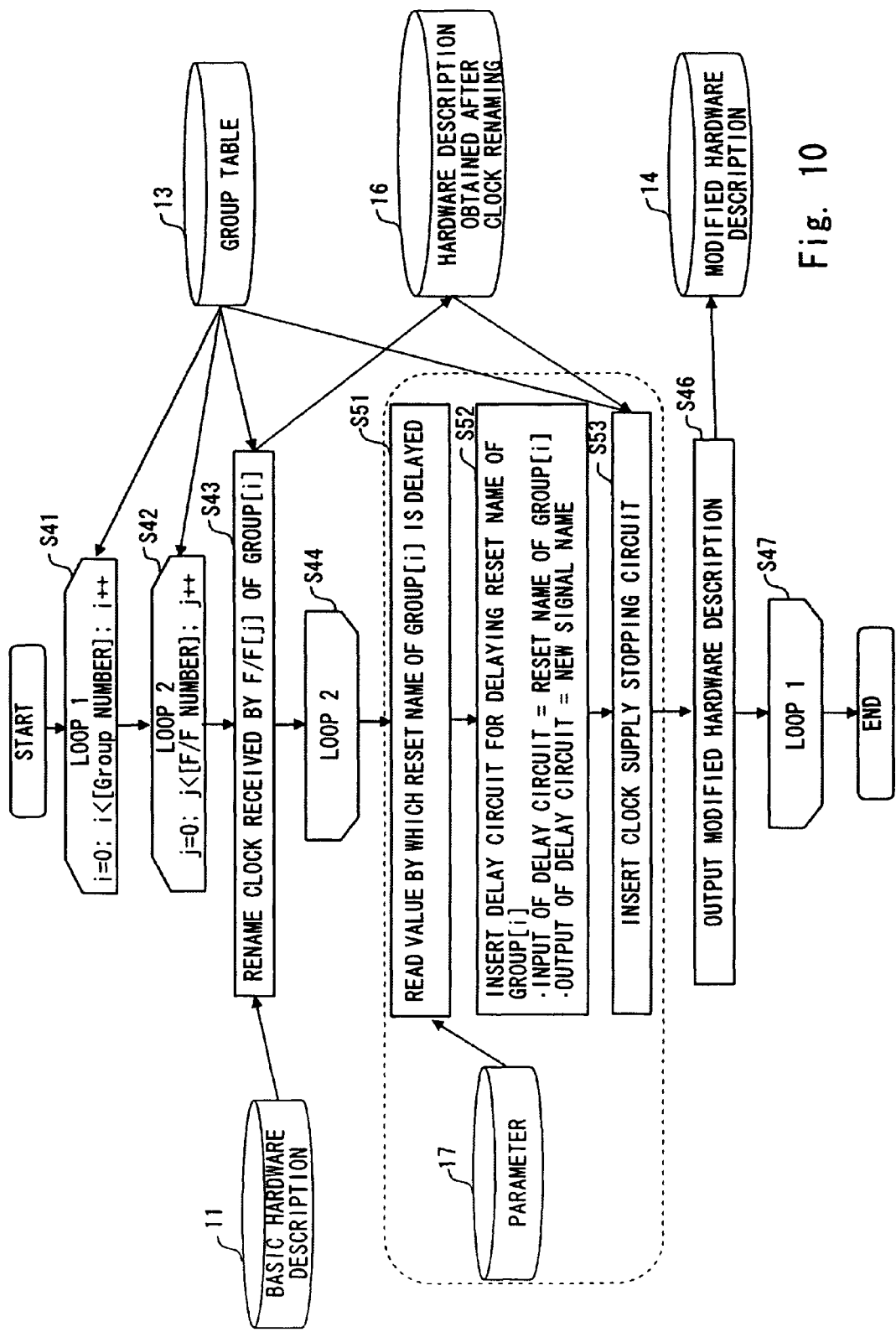
FIG. 10 is a flowchart showing an operation example of an insertion unit according to the second embodiment.

FIG. 10 is a flowchart showing an example of an operation of the CPU 3 to insert the clock supply stopping circuit according to the second embodiment. In the second embodiment, the CPU 3 newly obtains a parameter 17 as input information. The parameter 17 is delay information for determining what (which element) delays an enable status of the clock supply stopping circuit to be automatically inserted and for determining how much the enable status is delayed. That is, the parameter (delay information) is information for delaying the enable status and for extending the period for the clock supply stopping circuit to stop the clock supply. For example, the parameter 17 may be described in the insertion unit 23 as information that can be arbitrarily given by a circuit designer. FIGS. 11 to 13 show examples of the parameter. For example, the example of the parameter 17 in FIG. 11 shows that the enable status of the clock supply stopping circuit to be inserted is delayed by three clocks with respect to the clock CLK1, and the enable status of the clock supply stopping circuit to be inserted is delayed by three clocks with respect to the clock CLK2.

Further, in the example of the parameter shown in FIG. 12, the enable status of the clock supply stopping circuit to be inserted is delayed by 5 msec by use of a delay element. In the example of the parameter shown in FIG. 13, the enable status of the clock supply stopping circuit to be inserted is delayed by use of two delay elements TDXDLY1.

Figure 4:
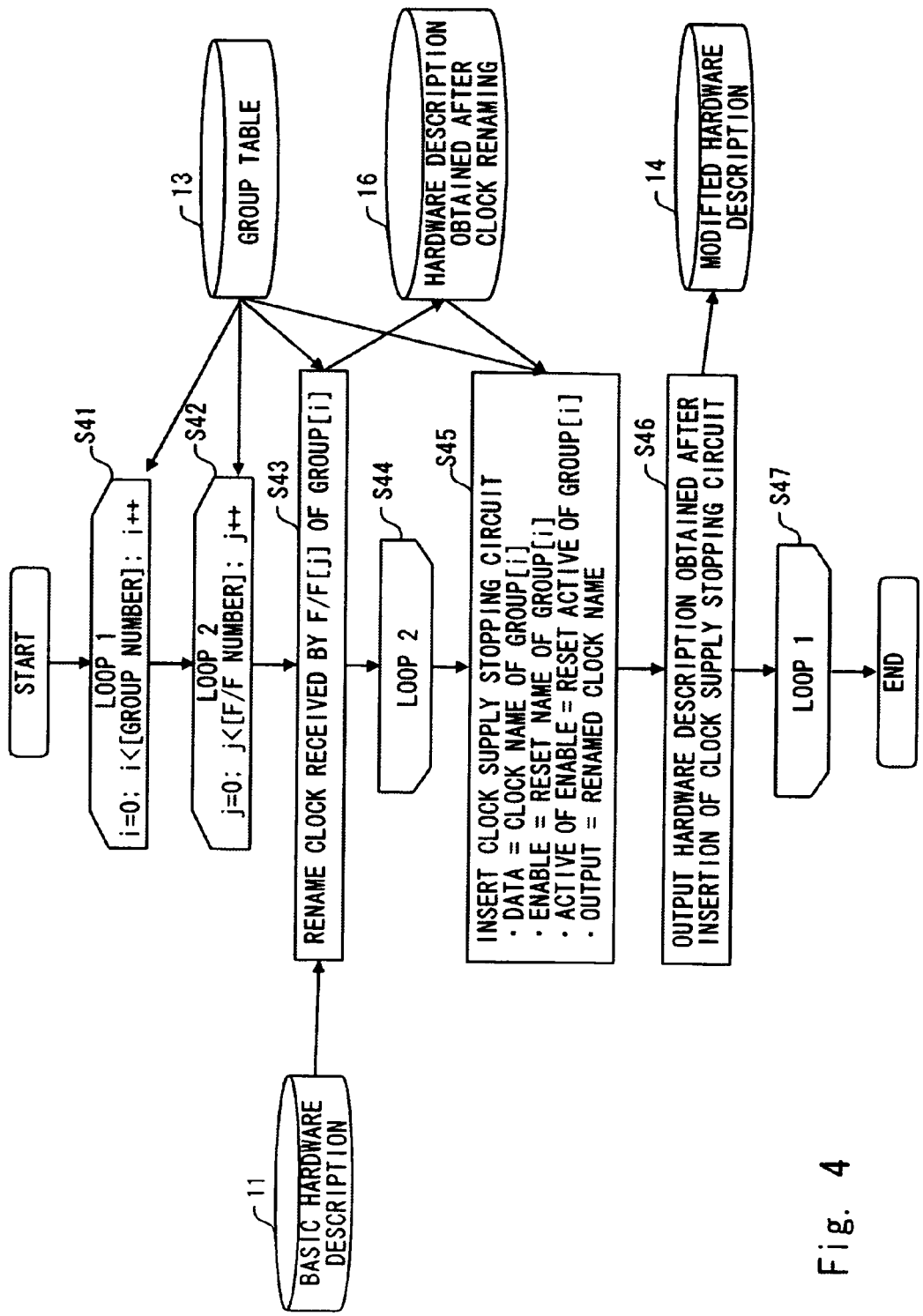
FIG. 4 is a flowchart showing an operation example of an insertion unit according to the first embodiment.

Further, in the processing shown in FIG. 10, in comparison with the processing of FIG. 4, the CPU 3 adds and executes processing of Steps S51 and S52. Step S45 of FIG. 4 corresponds to Step S53 of FIG. 10. The other processing is similar to that of FIG. 4, and a description thereof is omitted. A description is given of processing that is added and changed as indicated by the processing surrounded by the dotted line of FIG. 10. In a similar manner as in the case described according to the first embodiment, the CPU 3 obtains the hardware description 16, which is obtained after clock renaming, as intermediate data. After that, the CPU 3 repeats the processing of Steps S51 and S52 the number of times corresponding to the number of groups stored in the group table 13. The CPU 3 obtains the parameter 17 first. Specifically, the CPU 3 reads a delay value of a signal corresponding to the reset name of one processing target group among the groups stored in the group table 13 (S51). For example, when the first group of the group table 13 shown in FIG. 8 is the processing target group and when the parameter 17 contains information shown in FIG. 11, the CPU 3 obtains, from the parameter 17, information indicative of delaying the signal RSTB, which is received by each of the F/Fs contained in the Group 1 of FIG. 8, by three clocks of the CLK1 (S51). Next, in Step S52, the CPU 3 inserts data of a delay circuit for delaying the signal corresponding to the reset name of the one processing target group among the groups stored in the group table 13 (S52).

Specifically, the CPU 3 sets the name of the reset signal received by each of the F/Fs contained in the one processing target group, to an input terminal (Input) of the delay circuit represented in the hardware description (S51). For example, when the processing target group corresponds to the first group shown in FIG. 8 and when the parameter contains information shown in FIG. 11, the CPU 3 obtains a delay value corresponding to three clocks of the CLK1 from the parameter 17 (S51). Then, in the subsequent step, it is necessary for the CPU 3 to insert data of the delay circuit into the hardware description obtained after clock renaming so as to delay the reset signal RSTB, which is received by each of the F/F1 and F/F2 represented in the hardware description obtained after the clock renaming, by three clocks of the CLK1. Accordingly, the CPU 3 prepares data of the delay circuit in advance. The CPU 3 sets the name of the signal received at the input terminal of the delay circuit represented in the hardware description, as RTSB. Next, the CPU 3 replaces the name of the signal received at an output terminal (Output) of the delay circuit, with a new signal name which is newly created. The delay circuit is a circuit for outputting a reset signal from the output terminal. That is, the delay circuit receives the reset signal through the input terminal, and outputs the received reset signal through the output terminal Output after elapse of a predetermined delay time. For example, the delay circuit inserted based on the parameter shown in FIG. 11 with respect to the first group shown in FIG. 8 outputs the received reset signal RSTB through the output terminal after elapse of time corresponding to three clocks of the CLK1, from the time when the reset signal RSTB is received.

In Step S45 of FIG. 4, the CPU 3 sets the name of the reset signal received by the F/Fs represented in the i-th group information, to the enable terminal of the clock supply stopping circuit. On the other hand, in Step S53, the CPU 3 replaces the name of the signal received at the enable terminal of the clock supply stopping circuit, with a new signal name created in Step S52 (S53). Specifically, the other data is similar to that shown in Step 45 of FIG. 4. In this case, as in the first embodiment, the clock supply stopping circuit has three terminals, that is, a data terminal, an enable terminal, and an output terminal. Among the three terminals, the data terminal is a terminal for receiving a clock, the enable terminal is a terminal for receiving a reset signal, and the output terminal is a terminal for outputting a signal. The CPU 3 sets the name of the signal received at the data terminal of the clock supply stopping circuit, as the name of the clock signal received by each of the F/Fs represented in the i-th group information to be processed (S53). Further, the CPU 3 sets the name of the signal received at the enable terminal of the clock supply stopping circuit, as the name of the output signal of the delay circuit inserted in Step S52 (S53).

Furthermore, the CPU 3 sets the reset active information (Hi or Low) of each of the F/Fs represented in the i-th group information to be processed, as active information of the enable status of the clock supply stopping circuit (S53). Lastly, the CPU 3 sets the name of the signal output from the output terminal of the clock supply stopping circuit, as the name of the clock signal renamed in Step S43 (S53). The CPU 3 repeats the processing from S42 to S46 of FIG. 10 the number of times corresponding to the number of groups obtained in Step 41. Then, the CPU 3 completes the modified hardware description 14 representing the circuit in which the clock supply stopping circuit is inserted into the F/Fs contained in each group of the group table and in which the delay circuit is connected to the enable terminal of the corresponding clock supply stopping circuit (S53). Specifically, the CPU 3 obtains the modified hardware description 14 that represents a circuit shown in FIG. 14. By comparison with the circuit shown in FIG. 6, it is apparent that the circuit shown in FIG. 14 includes delay circuits. The CPU 3 accesses the data storage area 10 of the memory 2 via the bus 5, and writes the modified hardware description to the data storage area 10.

Figure 14:
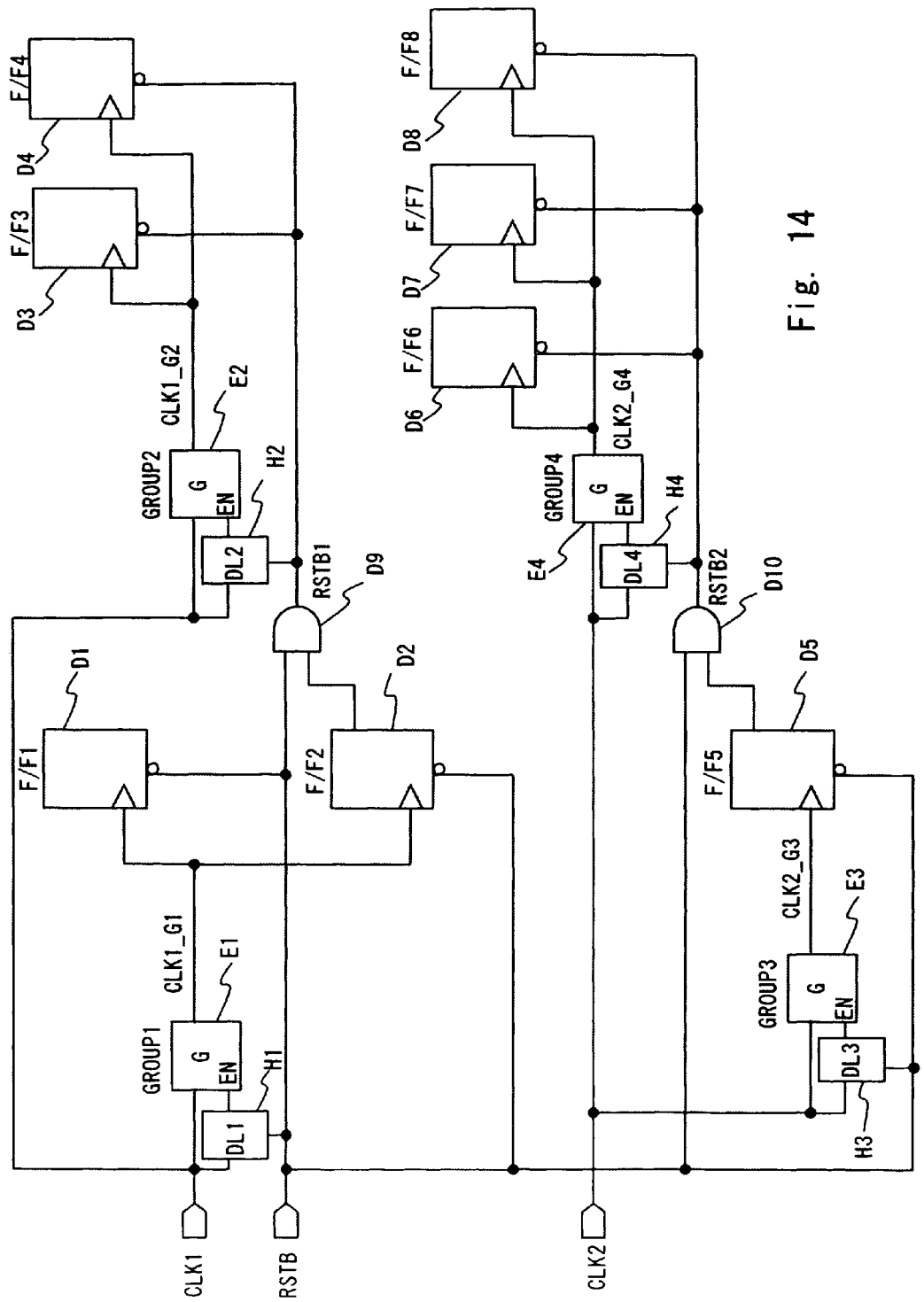
FIG. 14 is a diagram showing an example of a circuit represented in a modified hardware description that is obtained by automatically inserting data of a clock supply stopping circuit and a delay circuit into the basic hardware description shown in FIG. 5 according to a second embodiment of the present invention.
Figure 15:
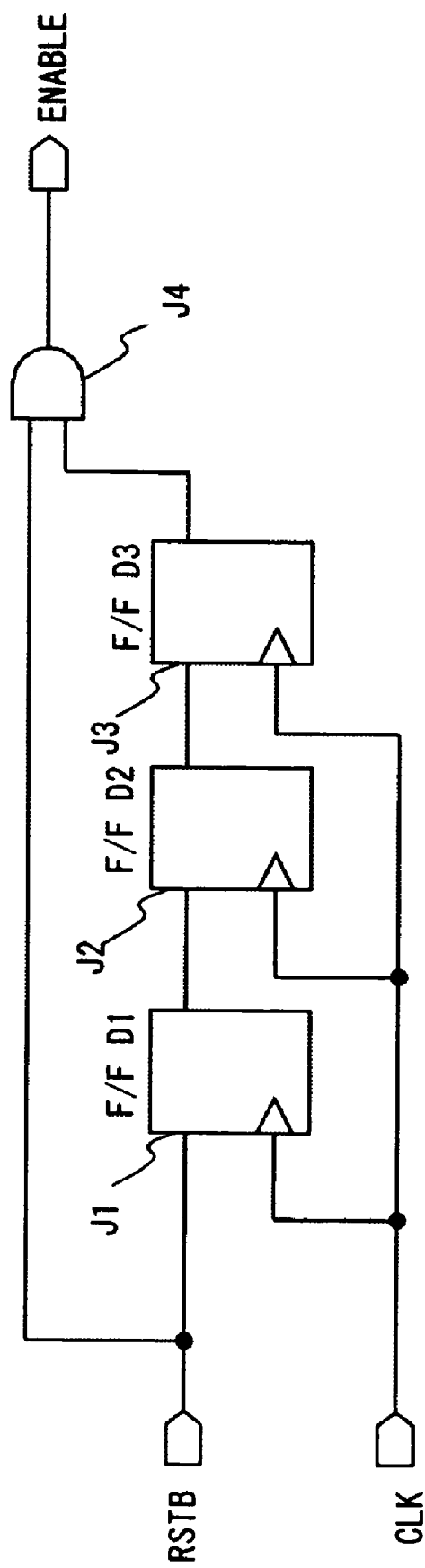
FIG. 15 is a diagram showing an example of an internal circuit configuration of the delay circuit.

Referring to FIGS. 14 and 15, a description is given of an example of the logic circuit represented in the modified hardware description 14 that is obtained by automatically inserting data of the clock supply stopping circuit and the delay circuit into the basic hardware description by the application of the circuit design device 1 according to the second embodiment. FIG. 14 is a diagram showing an example of the circuit represented in the modified hardware description that is obtained by automatically inserting data of the clock supply stopping circuit and the delay circuit into the basic hardware description shown in FIG. 5. FIG. 15 is a diagram showing an example of the internal circuit configuration of the delay circuit.

In the example of the circuit shown in FIG. 14, data of each of a delay circuit DL1 (H1) for the clock supply stopping circuit (E1) of the Group 1, a delay circuit DL2 (H2) for the clock supply stopping circuit (E2) of the Group 2, a delay circuit DL3 (H3) for the clock supply stopping circuit (E3) of the Group 3, and a delay circuit DL4 (H4) for the clock supply stopping circuit (E4) of the Group 4 is added to the modified hardware description (see FIG. 6) generated according to the first embodiment.

FIG. 15 shows the internal circuit configuration of each of the delay circuits DL1 (H1) to DL 4 (H4). An input signal RSTB of FIG. 15 corresponds to each of the RSTB in the delay circuit DL1 (H1) of FIG. 14, the RSTB1 in the delay circuit DL2 (H2), the RSTB in the delay circuit DL3 (H3), and the RSTB2 in the delay circuit DL4 (H4).

Likewise, the input signal CLK1 of FIG. 15 corresponds to each of the CLK1 in the delay circuit DL1 (H1) of FIG. 14, the CLK1 in the delay circuit DL2 (H2), the CLK2 in the delay circuit DL3 (H3), and the CLK2 in the delay circuit DL4 (H4). Further, an output signal Enable of FIG. 15 corresponds to a signal connected to an enable terminal (EN) serving as an input terminal of one clock supply stopping circuit of FIG. 14.

In FIG. 15, the output signal Enable corresponds to a logical AND (J4) between a signal, which is obtained by delaying the RSTB by three clocks of the CLK using an F/F D1 (J1), an F/F D2 (J2), and an F/F D3 (J3), and the RSTB. The F/F D1 (J1), the F/F D2 (J2), and the F/F D3 (J3) are F/Fs that operate in response to a rising edge of the CLK. FIG. 15 shows an example of an internal configuration of the example of the parameter shown in FIG. 11. The parameter 17 shown in FIG. 11 is used when the enable status of the clock supply stopping circuit to be inserted is delayed by three clocks with respect to the CLK1 and is delayed by three clocks with respect to the CLK2. For example, when the parameter 17 is a parameter for delaying the enable status of the clock supply stopping circuit to be inserted, the RSTB is delayed with respect to the clock CLK1 using five F/Fs in total as delay circuits to be inserted.

The delay circuits shown in FIG. 15 are each configured by an F/F. Alternatively, as in the example of the parameter shown in FIG. 13, when the two delay elements TDXDLY1 are inserted so as to delay the enable status of the clock supply stopping circuit to be inserted, the same effects can be obtained by the use of two delay elements TDXDLY1.

Figure 16:
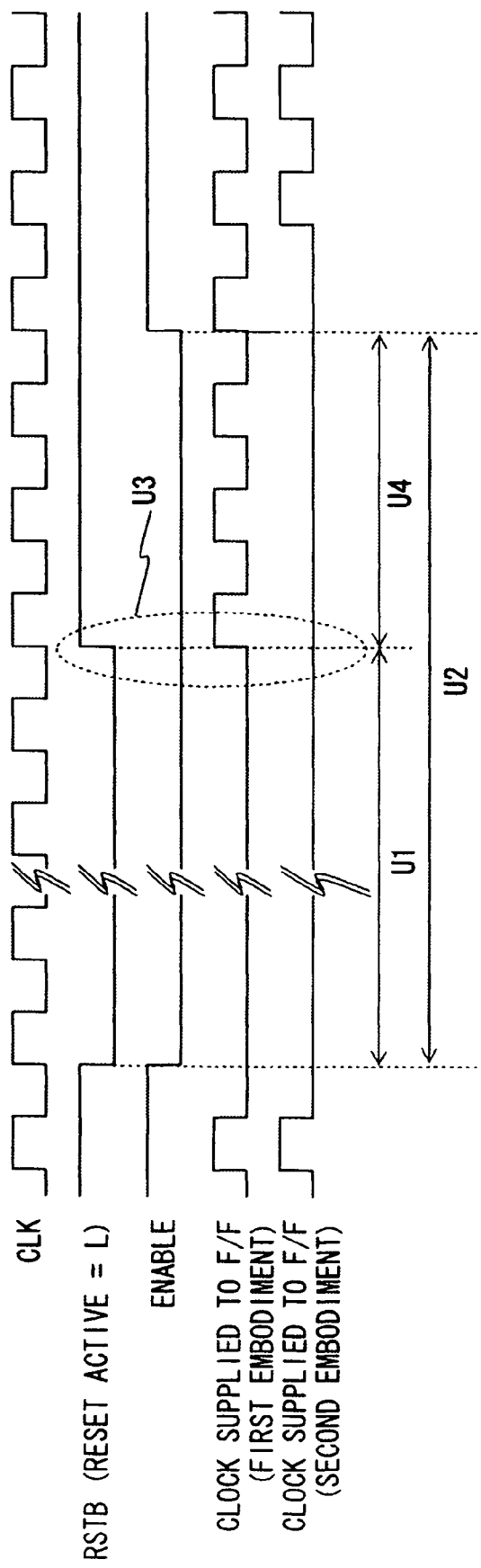
FIG. 16 is a timing chart showing an operation executed in a reset state by a logic circuit formed based on the modified hardware description shown as an example in FIG. 14.
Figure 17:
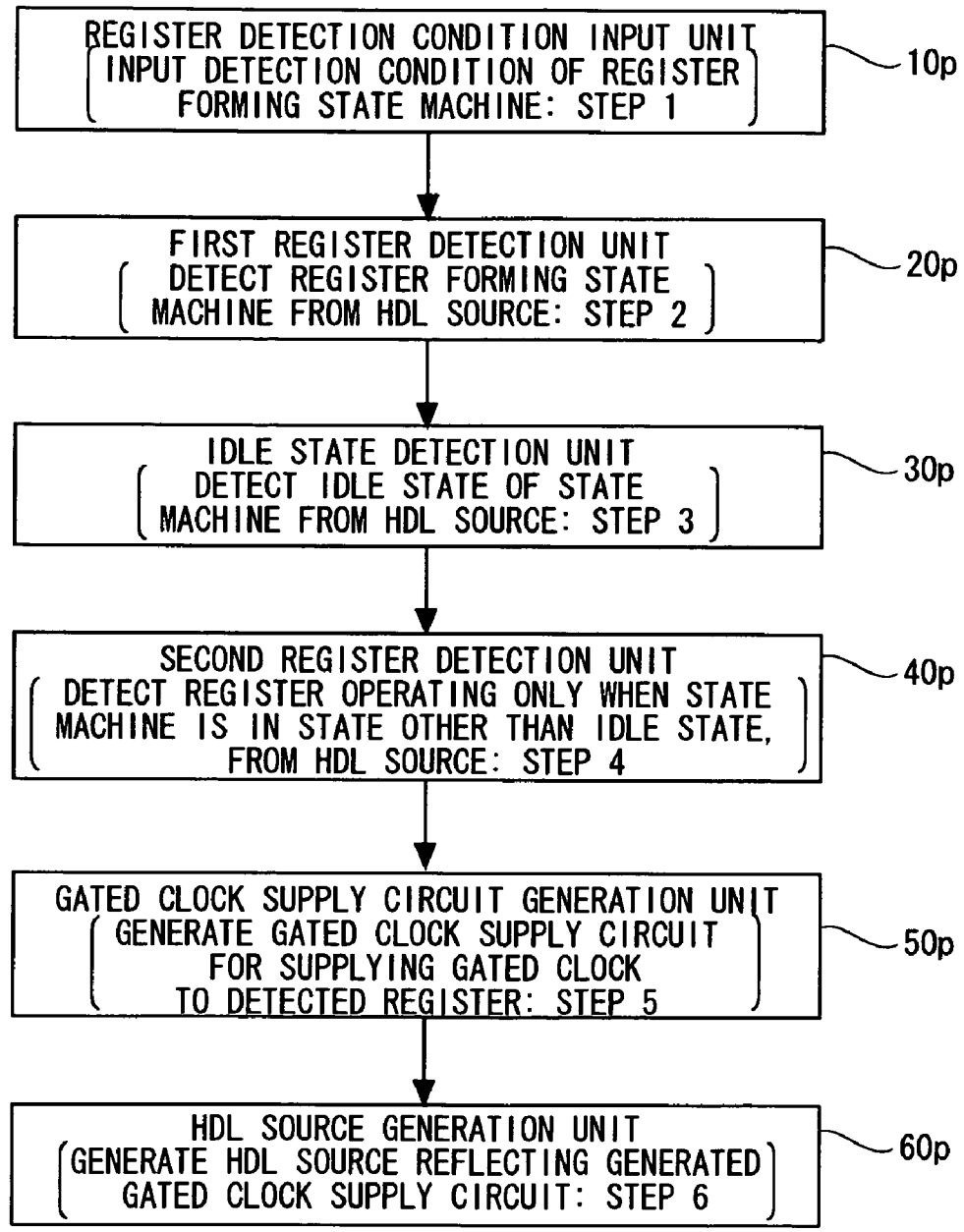
FIG. 17 is a schematic diagram showing an embodiment of a logic circuit design device disclosed in Japanese Unexamined Patent Application Publication No. 2003-330988.
Figure 18:
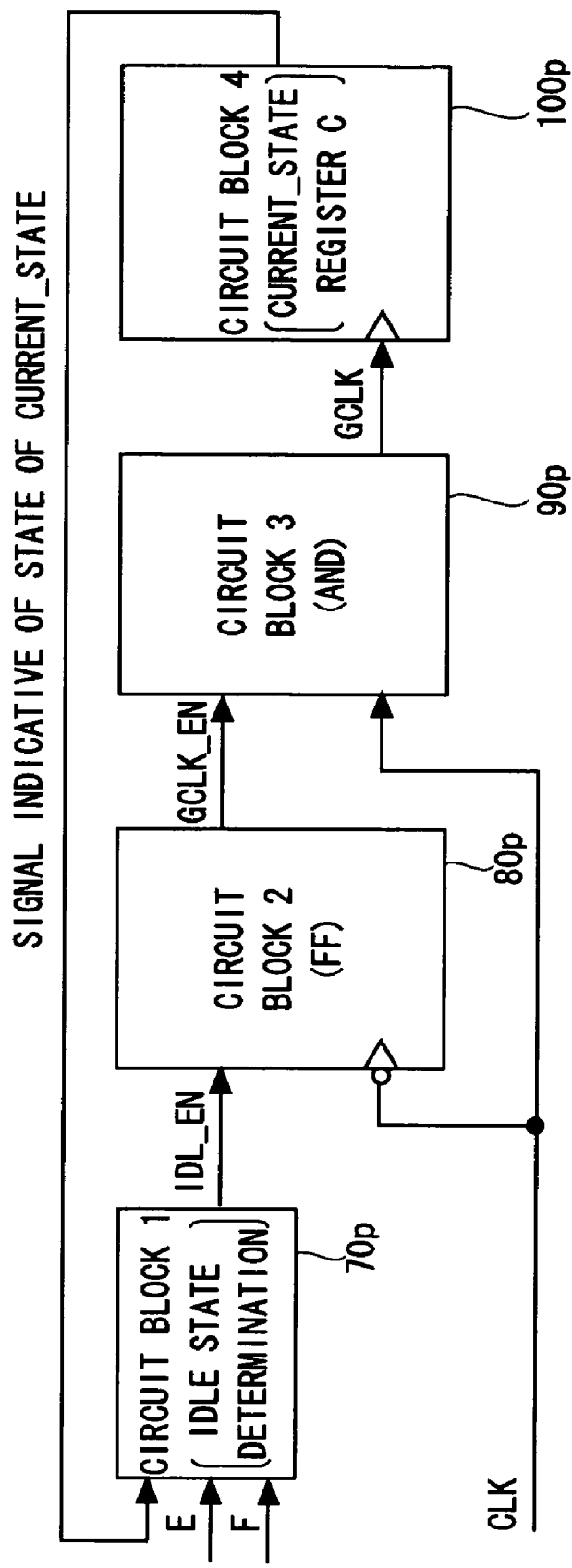
FIG. 18 is a circuit diagram showing a gated clock supply circuit generated by the logic circuit design device shown in FIG. 17.
Figure 19:
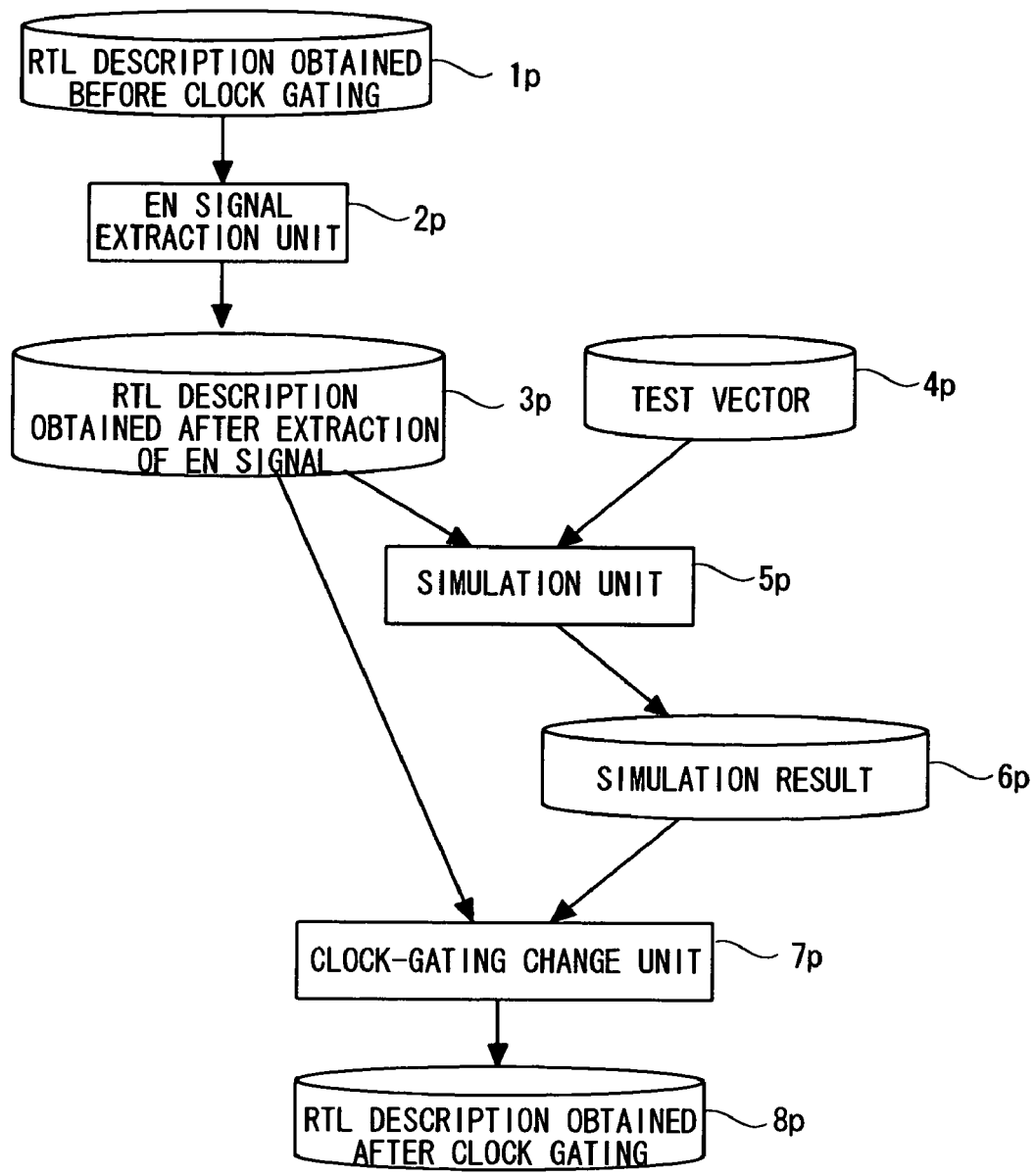
FIG. 19 is a diagram showing the configuration of a circuit design device disclosed in Japanese Unexamined Patent Application Publication No. 2002-92065.
Figure 20:
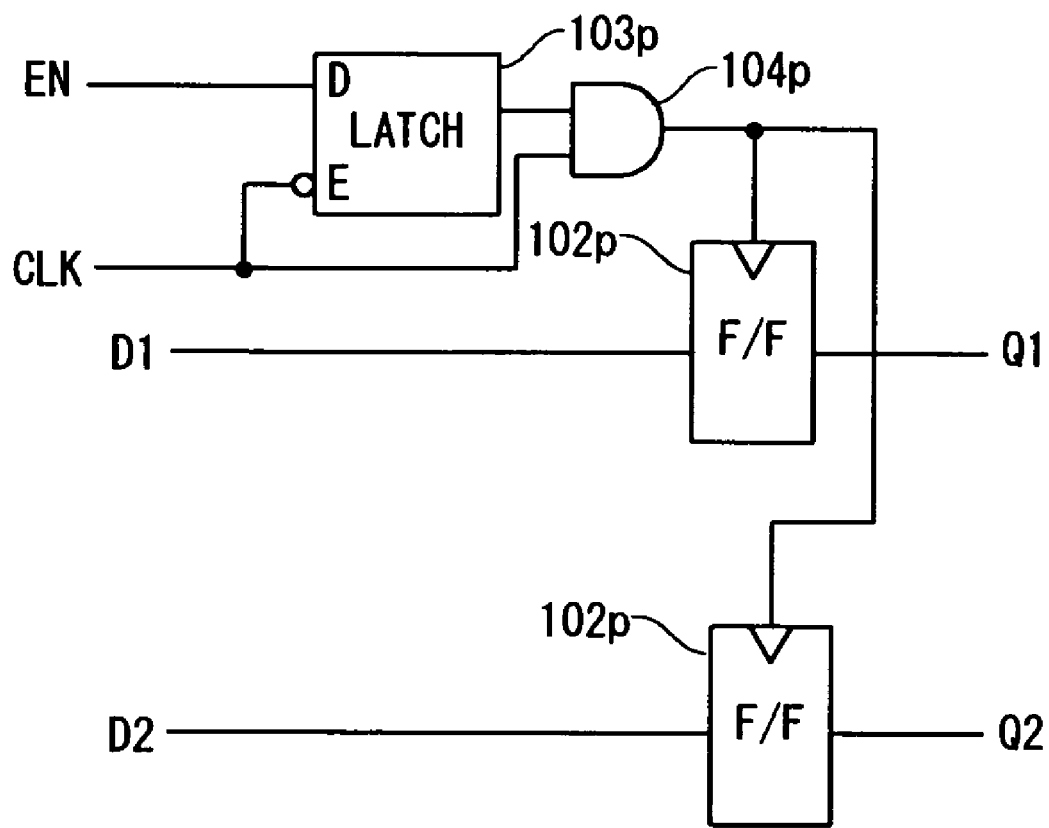
FIG. 20 is a diagram showing the configuration obtained by forming a gated clock using the circuit design device shown in FIG. 19.

Next, a description is given of a clock supply stopping operation executed in a reset state by the logic circuit represented in the modified hardware description 14 which includes data of the clock supply stopping circuit and which is obtained by the circuit design device and method according to the second embodiment. FIG. 16 is a timing chart showing the operation executed in the reset state by the logic circuit formed based on the modified hardware description shown as an example in FIG. 14.

A CLK shown in FIG. 16 corresponds to each of the CLK1 and CLK2 shown in FIGS. 6 and 14. A clock (according to the first embodiment) shown in FIG. 16 to be supplied to F/Fs corresponds to each of CLK1_G1, CLK1_G2, CLK2_G3, and CLK2_G4 shown in FIG. 6. A clock (according to the second embodiment) shown in FIG. 16 to be supplied to F/Fs corresponds to each of CLK1_G1, CLK1_G2, CLK2_G3, and CLK2_G4 shown in FIG. 14. An RSTB shown in FIG. 16 corresponds to the RSTB shown in FIGS. 6 and 14. An output signal Enable shown in FIG. 16 is output from the output terminal Output of each of the delay circuits DL1 to DL4 (H1 to H4) shown in FIG. 14, and corresponds to a signal connected to the enable terminal (EN) serving as an input terminal of the clock supply stopping circuit.

In FIG. 16, U1 represents a period between a falling edge and a subsequent rising edge of the RSTB. The first embodiment shows that, during the period U1, the clock supply to the F/Fs is stopped. U2 represents a period between a falling edge and a subsequent rising edge of the output signal Enable. The second embodiment shows that, during the period U2, the clock supply to the F/Fs is stopped. U4 represents a period by which the clock supply stopping operation is delayed by the inserted delay circuits.

In the first embodiment, the signal Enable for stopping the clock supply is equivalent to the RSTB, and the RSTB is asynchronous with the clock (CLK). As a result, there is a possibility that, at a timing U3 shown in FIG. 16, a timing at which the RSTB changes, matches the rising edge of the clock (according to the first embodiment) supplied to F/Fs. In this case, data of the F/Fs is unstable and becomes an indefinite value. Such a problem can be detected only in the verification performed in consideration of a delay obtained after execution of logic synthesis and layout processes in the logic design. When the problem is detected, there arises a problem in that amounts of turning back become large, which leads to an increase in development time and costs. In the second embodiment, at the timing U3 shown in FIG. 16, the supply of the clock (according to the second embodiment) to F/Fs is stopped (Low). Accordingly, there is no possibility that the timing at which the RSTB changes matches the rising edge of the clock (according to the second embodiment) supplied to the F/Fs when the reset state is released (U3). As a result, the data of the F/F is constantly stable and does not become an indefinite value. This is because the signal Enable is delayed by the delay circuits.

As described above, in the second embodiment as well as the first embodiment, it is possible to automatically insert the delay circuit for delaying the timing at which the signal Enable becomes active. As a result, the period for stopping the clock supply is extended, and the timing at which the reset state is released and the timing at which the clock supply is resumed can be shifted. Further, the period for stopping the clock supply is designated by a parameter, whereby the clock supply can be resumed at a timing desired by a designer.

As described above, according to one preferred embodiment of the present invention, the circuit design device, method, and program (hereinafter, referred to as "circuit design device etc.") perform circuit design for stopping clock supply to the F/Fs reset in the reset state. The circuit design device etc. insert the minimum size clock supply stopping circuit in the case of automatically inserting the clock supply stopping circuit. For this reason, the clock names, reset names, and reset active information, which are stored in the F/F information table of the hardware description that represents the logic circuit and is generated without implementing a clock supply stopping function as a circuit, are shared and classified, to thereby create the group table. Thus, data of the clock supply stopping circuit is automatically inserted into the hardware description that represents the logic circuit and is generated without implementing the clock supply stopping function as a circuit. As a result, the efficiency of the operation for designing the logic circuit can be improved. Further, the power consumption of the logic circuit in the reset state can be reduced.

Further, according to another preferred embodiment of the present invention, the circuit design device etc. perform the circuit design for automatically inserting the delay circuit as well as the clock supply stopping circuit. As a result, the period for stopping the clock supply can be extended. Thus, the circuit design device etc. are capable of preventing a timing at which the reset state is released and a clock change point from being matched with each other without carrying out the verification in consideration of the delay obtained after the execution of logic synthesis and layout processes, and are capable of improving the efficiency of the operation for designing the logic circuit.

It is apparent that the present invention is not limited to the above embodiments, but may be modified and changed without departing from the scope and spirit of the invention.

What is claimed is:

1. A circuit design device comprising:
a processor performing operations of
extracting flip-flops each receiving a first clock and a control signal, from flip-flops represented in a first hardware description representing a circuit;
generating a second hardware description by replacing the first clock received by each of the extracted flip-flops with a second clock; and
generating a third hardware description by inserting, into the second hardware description, data of a control circuit to stop supply of the second clock based on the first clock and the control signal.

2. The circuit design device according to claim 1, further comprising a memory device to store the first hardware description,
wherein the processor reads the first hardware description from the memory device and writes the third hardware description to the memory device.

3. The circuit design device according to claim 1, wherein the processor inserts, into the second hardware description, data of a delay circuit to delay transmission of the control signal to the control circuit.

4. The circuit design device according to claim 1, wherein the control signal is a reset signal received by each of the flip-flops represented in the first hardware description.

5. The circuit design device according to claim 4, wherein the processor extracts flip-flops receiving in common a clock, a reset signal, and a signal level indicating that the received reset signal is active, from the flip-flops represented in the first hardware description.

6. A non-transitory computer-readable medium having computer-readable instructions stored thereon to cause a computer to execute a process comprising:
extracting flip-flops each receiving a first clock and a control signal, from flip-flops represented in a first hardware description representing a circuit;
generating a second hardware description by replacing the first clock received by each of the extracted flip-flops with a second clock; and
generating a third hardware description by inserting, into the second hardware description, data of a control circuit to stop supply of the second clock based on the first clock and the control signal.

7. The non-transitory computer-readable medium according to claim 6, wherein the process further comprises inserting, into the second hardware description, data of a delay circuit to delay transmission of the control signal to the control circuit.

8. A computer-implemented circuit design method, comprising:
extracting flip-flops each receiving a first clock and a control signal, from flip-flops represented in a first hardware description representing a circuit;
generating a second hardware description by replacing the first clock received by each of the extracted flip-flops with a second clock; and
generating a third hardware description by inserting, into the second hardware description, data of a control circuit to stop supply of the second clock based on the first clock and the control signal.

* * * * *